US008837332B2

(12) United States Patent
Khojastepour et al.

(10) Patent No.: US 8,837,332 B2
(45) Date of Patent: *Sep. 16, 2014

(54) METHOD FOR A CANCELING SELF INTERFERENCE SIGNAL USING PASSIVE NOISE CANCELLATION FOR FULL-DUPLEX SIMULTANEOUS (IN TIME) AND OVERLAPPING (IN SPACE) WIRELESS TRANSMISSION AND RECEPTION ON THE SAME FREQUENCY BAND

(75) Inventors: Mohammad A. Khojastepour, Lawrenceville, NJ (US); Karthikeyan Sundaresan, Howell, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/324,998

(22) Filed: Dec. 13, 2011

(65) Prior Publication Data

US 2012/0155336 A1 Jun. 21, 2012

Related U.S. Application Data

(60) Provisional application No. 61/422,303, filed on Dec. 13, 2010, provisional application No. 61/510,370, filed on Jul. 21, 2011.

(51) Int. Cl.
*H04J 1/12* (2006.01)
*H04J 3/10* (2006.01)
*H04B 1/00* (2006.01)
*H04B 15/00* (2006.01)
*H04B 1/10* (2006.01)
*H01Q 3/26* (2006.01)
*H01Q 21/00* (2006.01)
*H04B 7/10* (2006.01)
*H04B 7/04* (2006.01)

(52) U.S. Cl.
CPC ............... *H01Q 3/2605* (2013.01); *H04B 7/10* (2013.01); *H01Q 21/00* (2013.01); *H04B 7/0413* (2013.01)
USPC .......... 370/278; 370/201; 370/286; 455/63.1; 455/222; 455/283; 455/501; 455/317

(58) Field of Classification Search
USPC ......... 370/277, 278, 201, 268, 269, 286, 289; 455/63.1–65, 222–224, 283–288, 455/501–506, 317, 318
See application file for complete search history.

(56) References Cited

U.S. PATENT DOCUMENTS

| 4,560,945 | A * | 12/1985 | Olver ........................... 330/149 |
| 6,516,050 | B1 * | 2/2003 | Tasaki et al. ...................... 379/3 |
| 6,792,250 | B1 * | 9/2004 | Zarubin ..................... 455/115.1 |
| 7,031,251 | B2 * | 4/2006 | Chen et al. .................... 370/208 |
| 7,058,368 | B2 * | 6/2006 | Nicholls et al. ............. 455/114.2 |
| 7,173,484 | B2 * | 2/2007 | Rabinovich et al. ............ 330/52 |
| 7,702,004 | B2 * | 4/2010 | Deas et al. .................... 375/220 |
| 7,778,209 | B2 * | 8/2010 | Lin et al. ...................... 370/286 |
| 7,826,808 | B2 * | 11/2010 | Faulkner .................... 455/114.2 |

(Continued)

*Primary Examiner* — Jenee Williams
(74) *Attorney, Agent, or Firm* — Akitaka Kimura

(57) ABSTRACT

A method for full duplex communication that includes creating a canceling self interference signal using a passive noise cancellation, and attaining full-duplex simultaneous in time and overlapping in space wireless transmission and reception on same frequency band responsive to the step of creating a canceling self interference signal.

3 Claims, 8 Drawing Sheets

(56) References Cited

U.S. PATENT DOCUMENTS

| | | | |
|---|---|---|---|
| 8,290,451 B2* | 10/2012 | Komatsu et al. | 455/114.2 |
| 2002/0009057 A1* | 1/2002 | Blackwell et al. | 370/286 |
| 2002/0048265 A1* | 4/2002 | Glass | 370/286 |
| 2002/0072344 A1* | 6/2002 | Souissi | 455/296 |
| 2002/0085510 A1* | 7/2002 | Chan | 370/286 |
| 2002/0150059 A1* | 10/2002 | Blake | 370/286 |
| 2003/0206579 A1* | 11/2003 | Bryant | 375/219 |
| 2004/0001450 A1* | 1/2004 | He et al. | 370/286 |
| 2004/0053579 A1* | 3/2004 | Ferianz | 455/73 |
| 2004/0116160 A1* | 6/2004 | Deas et al. | 455/570 |
| 2004/0120272 A1* | 6/2004 | Yong-Woon | 370/292 |
| 2004/0198295 A1* | 10/2004 | Nicholls et al. | 455/296 |
| 2005/0018596 A1* | 1/2005 | Washburn et al. | 370/201 |
| 2005/0113052 A1* | 5/2005 | Rabinovich et al. | 455/194.2 |
| 2005/0186933 A1* | 8/2005 | Trans | 455/296 |
| 2006/0221874 A1* | 10/2006 | Brobston et al. | 370/280 |
| 2006/0250998 A1* | 11/2006 | Beaucoup et al. | 370/286 |
| 2008/0151787 A1* | 6/2008 | Lin et al. | 370/276 |
| 2008/0219377 A1* | 9/2008 | Nisbet | 375/296 |
| 2009/0068965 A1* | 3/2009 | Faulkner | 455/114.2 |
| 2009/0149130 A1* | 6/2009 | You et al. | 455/63.1 |
| 2011/0274017 A1* | 11/2011 | Brobston et al. | 370/288 |

* cited by examiner

METHOD FOR A CANCELING SELF INTERFERENCE SIGNAL USING PASSIVE NOISE CANCELLATION FOR FULL-DUPLEX SIMULTANEOUS (IN TIME) AND OVERLAPPING (IN SPACE) WIRELESS TRANSMISSION AND RECEPTION ON THE SAME FREQUENCY BAND

This application claims the benefit of both U.S. Provisional Application No. 61/422,303, entitled, "Full Duplex Simultaneous (In Time) and Overlapping (In Space) Wireless Transmission/Reception on the Same Frequency Band", filed Dec. 13, 2010, and U.S. Provisional Application No. 61/510,370, entitled, "Case for Antenna Cancellation for Scalable Full-Duplex Communications", filed December Jul. 21, 2010, and is related to both co-pending patent application Ser. No. 13/324,948, filed Dec. 13, 2011, entitled "Method for a Canceling Self Interference Signal Using Active Noise Cancellation in the Air for Full Duplex Simultaneous (In Time) and Overlapping (In Space) Wireless Transmission & Reception on the Same Frequency band", and co-pending patent application Ser. No. 13/324,981, filed Dec. 13, 2011, entitled "Method for a Canceling Self Interference Signal Using Active Noise Cancellation in RF Circuits and Transmission Lines for Full Duplex Simultaneous (In Time) and Overlapping (In Space) Wireless Transmission & Reception on the Same Frequency band", of which all the contents are incorporated herein by reference.

BACKGROUND OF THE INVENTION

The present invention relates generally to cellular basestations and more particularly to full duplex simultaneous (In Time) and overlapping (In Space) wireless transmission and reception on the same frequency band.

The transmission and reception in current commercial wireless communication systems occur in orthogonal resource blocks (RB) where a resource block indicates a specific partition of available frequency resources in space and time. Two resource blocks are orthogonal if they either differ in frequency, time or space or a combination of these. In particular, cellular systems are designed such that uplink and downlink transmissions take place in orthogonal time, i.e., time division duplex (TDD) systems, or in different frequencies, i.e., frequency division duplex (FDD) systems. In conventional cellular systems there is no direct communication among the users or among the base stations over the air, therefore, there are only two communication modes of interest: the downlink transmission from a base-station to a user or the uplink transmission from a user to the base-station.

More recent wireless communication system designs consider the use of relays to improve the transmission range, rate, and reliability. However, still orthogonal resource blocks have to be used for the transmission and reception from the relays. Systems that work under the orthogonality constraints on the resource blocks for transmission and reception from any of the network terminals, e.g., the base stations, relays, users etc. are deemed to work in the half duplex (HD) mode.

In contrast, a full duplex (FD) system is one in which the terminals are able to transmit and receive on the same resource blocks, i.e., a terminal can transmit and receive in the same frequency band at the same time (and of course the same space, as the transmit and receive antennas on the terminal, in general, are close to each other). If a FD is enabled, then many system functions have to be redesigned including the design of control signals, physical layer schemes such as relaying, and MAC and upper layer signaling and operations such as scheduling. The simplest and most direct benefit of a FD enabled system, however, is doubling of the aggregate uplink-downlink capacity. A FD enabled wireless system would add to the spectral efficiency per area (eg. bits/second/Hz/meter$^2$) enabled by newer technologies such as relays and femto-cells. Also, the use of multiple antenna transmission in FD systems would result in at least the same benefits as in HD systems. Other benefits of FD transmission include the elimination of frequency guard band between the uplink and downlink frequency band found in FDD systems and the elimination of uplink-downlink synchronization found in TDD systems.

There are a number of well-known problems in ad-hoc networks such as the Deafness problem, the Hidden terminal problem etc., that can be easily solved when full duplex communication is enabled. Moreover, in CSMA networks it is possible to improve collision avoidance and collision notification schemes which in turn would improve effective network capacity. In these cases, the net effect would be more than just the doubling of the aggregate transmission/reception rate at any particular terminal.

The main obstacle to FD implementation is the lack of availability of practical designs rather than any inherent physical limitation. In theory, since the terminal is (non-causally) fully aware of the local signal to be transmitted, it should be able to subtract it from the received signal. However, several factors affect the implementation of such a solution. First, at a terminal, the local transmission from the transmit antenna and the reception at the received antenna are affected by the antenna pattern. Second, the received signals have traveled through the air (from another terminal) and are attenuated at least as much as the free-space loss. Thus, exact recreation of the signal intended to be received at the receiver (we will refer to this as the "intended receive signal" from now on) might not be possible or very hard. Third, what aggravates the problem even more is the power ratio between the locally transmitted signal (which is self interfering) and the received signal, which is usually large (ie, the locally transmitted signal power could be several orders of magnitudes larger than the received signal power).

Therefore, even a slight deviation in the device functions of the devices that are used to subtract the locally transmitted (self interfering) signal from the received signal, would result in a considerable residue of the interfering signal power to leak and remain combined with the received signal; this may mask out the intended receive signal, completely. We further discuss this issue in more detail later in this paper. To achieve a better precision (than just radio-frequency level subtraction) one may think of using digital processing. However, the digitization noise would be more or at least comparable with the intended receive signal which could make the recovery of this signal impossible. This problem is somewhat similar to the reception problem in satellite communications where the received signal is usually very close to the noise floor. In this case, even with HD transmission, it becomes hard to identify the intended receive signal.

Recent works have considered the feasibility of full duplex (FD) wireless communications in practice. While the first FD system by one person relied on a specific antenna cancellation technique to achieve a significant portion of self-interference cancellation, the various limitations of this technique prompted latter works to move away from antenna cancellation and rely on analog cancellation achieved through channel estimation. However, the latter systems in turn require the use of variable attenuator and delay elements that need to be automatically tuned to compensate for the self-interference channel. This not only adds complexity to the overall system but also makes the performance sensitive to wide-band channels. More importantly, none of the existing FD schemes can be readily scaled to MIMO systems where the nodes have more than two antennas.

By enabling full duplex communication we can simultaneously send in the uplink and downlink and it could mean doubling the use of spectrum, See FIG. 1. In half-duplex systems we either receive or transmit in time TDD or in frequency FDD, so it may be thought that we waste half of the resources.

The main challenge of the full duplex communication is to cancel the self interference that is orders of magnitude stronger than the received signal from the intended transmitters. However this interference is partly known due to the fact that the transmitter exactly knows its own transmitted signal however the exact channel between the transmit and receive antennas at the base station is not known. It would be even worse if this channel is time varying (fading) because we then need to estimate this channel more frequently. FIG. 2 shows the strong self interference in comparison to the weak received signal from a mobile station or user.

There are two possible deployments of the full duplex communication with respect to a fixed number of transmit and receive RF chains. In practice the main complexity involved with the use of multiple antenna systems is associated with the number of RF chain due to the fact that channel estimation, precoding, beamforming, multiple stream transmission, and demodulation all depends on the number of receive RF chains or transmit RF chains. Depending on if we use one antenna for each pair of the transmit RF chain and receive RF chain or if we use two antenna one for receive RF-chain and one for transmit RF-chains. we can have one of the two possible deployment scenarios. Please see FIG. 3.

While both systems might have marginal pros or cons in half-duplex systems, Applicants strongly advocate the use of one antenna per RF chain for full duplex communication because it does not change the system complexity. The cost associated with using more physical antennas well worth the possible gain that can be achieved by this deployment scenario. In the sequel, we provide methods for both systems and in particular we address how to allocate the antennas for either transmit or receive if the other deployment scenario is used.

A full-duplex wireless device that can transmit and receive at the same time in the same frequency band by definition would need at least one Tx and one Rx antenna. The key challenge in realizing such a device lies in addressing the self-interference generated by the Tx antenna at the Rx antenna. As an example, consider a WiFi signal with a transmit power of 20 dBm. A Tx-Rx antenna separation of about 6-8 inches results in a path loss of about 40 dBm (depending on channel characteristics), resulting in a self-interference of at least −20 dBm. With a noise floor around −93 dBm, one would further require a self-interference cancellation of at least 73 dB to be able to decode the desired received signal. While one can solely employ digital interference cancellation techniques, current ADC's do not have a resolution to pass a received signal which is 73 dB less than the noise floor. Hence, several practical full duplex (FD) systems \cite{choi-mobicom'10,jain-mobicom'11,melissa-asilomar'10} have been proposed that couple RF cancellation along with digital cancellation to achieve the desired level of self-interference suppression.

A prior known work proposed an architecture that used a combination of RF cancellation and digital cancellation techniques. RF cancellation included both antenna as well as analog cancellation (using noise cancellation circuits), contributing around 30 dB and 20 dB of cancellation respectively. With an additional 10 dB from digital cancellation, this resulted in a total of 60 dB suppression. Although not sufficient for WiFi, this was sufficient to enable FD communication in 802.15.4 systems (with 0 dBm transmit power). Antenna cancellation was achieved with the help of two Tx antennas (three in total) being placed at d and d+$\lambda$/2 distance from the Rx antennas. The $\lambda$/2 adds a phase shift of $\pi$ to one of the transmitted signals to help cancel the other transmitted signal at the Rx antenna.

Three limitations of such an antenna cancellation approach were pointed out in previous works: (i) the dependence on $\lambda$ allows for maximum cancellation only at the center frequency, with performance degrading for frequencies away from the center—a problem for wideband systems; (ii) employing an additional antenna may not justify the gains compared to a 3×3 MIMO system, and (iii) due to asymmetric antenna placement, manual tuning of amplitude and phase of the closer Tx antenna is required to achieve a null, which prevents real-time operation.

The first limitation is that the design required the placement of one of the Tx antennas at a distance d+$\lambda$/2 which then depends on the bandwidth and thus leading to maximum cancellation only at the center frequency (and hence not efficient for wideband signals). Such placement was dictated by the need to create a $\pi$ phase shift between the two Tx signals and could have been enabled through a phase shifter internal to the device which would then have led to a symmetric antenna placement. The authors of that work argued against such a design under the assumption that it will create many null points at the far-field. But this assumption was based on a free-space path loss model for the far-field while in reality the far-field in general should be modeled under the Raleigh fading model; thus there should be no more nulls in the far-field with symmetric placement of antennas than asymmetric placements.

The second limitation is that the design requires an extra antenna which may not be justifiable compared to a 3×3 MIMO system. MIMO transmissions require each antenna to have a Tx/Rx chain which is not the case here; antenna cancellation merely requires an extra passive antenna element together with a fixed phase shifter and the overhead is not comparable to a MIMO system. If at all any comparison should be made, it should be with a 2×2 MIMO system. Even a single antenna system would require two communications processing chains, one for Tx and one for Rx; thus a comparison with a 2×2 MIMO system may not be justifiable either.

The third limitation is that the design requires manual tuning of variable attenuators and phase shifters to compensate for channel changes (even if channels between the two Tx antennas and the Rx antenna are symmetric, the channels will still change with time); such requirement is primarily due to the use of asymmetric positioning of the antennas (see the first limitation above) and thus disappears when antennas are symmetrically placed.

One other limitation Applicant sees with antenna cancellation using asymmetric placement antennas is that it is not apparent how it can scale to MIMO systems. Although one might envision an extension using two Tx and one Rx antenna for every transmitted/received MIMO stream, this would require antennas to be placed such that each of the Tx pairs lead to self-interference signals which are 180 degrees out of phase at every Rx antenna.

To avoid the above limitations, the authors moved away from antenna cancellation and instead proposed the use of a two antenna (one Tx, one Rx) in their subsequent scheme, where a form of analog (BALUN—balanced to unbalanced transformer) cancellation was used.

A BALUN element acts as a π phase shifter, which was shown to have a better frequency response over a wideband compared to the λ dependent phase shift created using an asymmetric antenna placement. BALUN cancellation was shown to yield 40-45 dB of cancellation; this coupled with 30 dB cancellation using digital cancellation provided the desired level of self-interference suppression for WiFi signals. However, such a design encounters the following limitation. While a BALUN element can create a negative copy of the transmitted signal that can be applied internally to cancel self-interference, one also needs to account for the wireless channel between the Tx and Rx antennas. For this reason, a variable attenuator and delay element are also needed on the path, which in turn have to be auto-tuned and adapted to track the self-interference channel. This not only makes the design complicated but also the performance quite sensitive to wideband channels. Although with manual tuning it is shown that 40-45 dB cancellation could be achieved, in practice, auto-tuning leads to only a 20 dB cancellation. Other works on FD implementations also do not consider antenna cancellation but consider hybrid schemes where an estimate of the self-interference signal in the digital domain is combined with a negated copy of the transmitted signal in the analog domain to achieve cancellation. This along with digital cancellation was shown to yield only about 35 dB of cancellation, falling short of the desired target.

Next generation wireless devices (access points, base stations, etc.) are expected to be equipped with multiple antennas (more than two). Hence, it is important to design a FD scheme that can co-exist with MIMO. Applicants observe that existing antenna cancellation and analog cancellation approaches cannot be readily extended to MIMO systems. Although one might envision an extension of using two Tx and one Rx antenna for every transmitted/received MIMO stream, this would require antennas to be placed such that each of the Tx pairs (for each stream) lead to self-interference signals which are 180 degrees out of phase at every Rx antenna. However, such an antenna placement cannot be realized for a MIMO system using the prior approach. On the other hand, analog cancellation discussed hereinabove, when extended to N stream MIMO, will potentially require one to estimate the self-interference channel between every pair of $N^2$ Tx-Rx antennas. This in turn results in the use of $N^2$ variable delays and attenuators, each of which has to be auto tuned and adapted to track the $N^2$ self-interference channels, which seems practically infeasible.

Based on Applicant's observations on the limitations of existing FD schemes, antenna cancellation using asymmetric antenna placement as in a prior work and our observation on the limitations of the two antenna scheme proposed already, Applicants propose and justify antenna cancellation with symmetric placement of antennas be considered as a primary RF cancellation technique for providing self-interference cancellation. Specifically, for a single stream transmission Applicants propose antenna cancellation with a symmetric placement of either two Rx antennas and one Tx antenna (which Applicants refer to as Rx antenna cancellation), or two Tx antennas and one Rx antenna (which Applicants refer to as Tx antenna cancellation), each of which is a dual of the other. Applicants show that this design could provide large self-interference cancellation with the following advantages: 1) It leads to the possibility of a two-level design where Tx antenna cancellation is followed by a Rx antenna cancellation with the theoretical potential to double the antenna cancellation gains because of its additive nature. 2) The design scales very easily to MIMO systems which would then enable the co-existence of MIMO with FD. 3) The design could potentially eliminate the need for any other form of analog cancellation which seems limited in practice due to the need for variable attenuators and delay elements and its subsequent lack of scalability to MIMO systems.

Accordingly, there is a need for full duplex simultaneous and overlapping wireless transmission/reception on the same frequency band.

BRIEF SUMMARY OF THE INVENTION

The invention is directed to a method for full duplex communication that includes creating a canceling self interference signal using a passive noise cancellation, and attaining full-duplex simultaneous in time and overlapping in space wireless transmission and reception on same frequency band responsive to the step of creating a canceling self interference signal.

These and other advantages of the invention will be apparent to those of ordinary skill in the art by reference to the following detailed description and the accompanying drawings.

DETAILED DESCRIPTION

Figure 1:
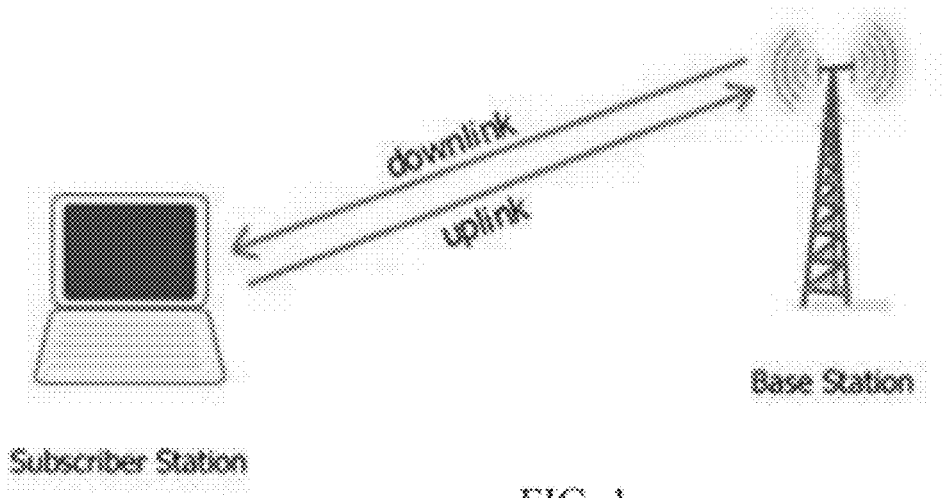
FIG. 1 depicts a full duplex communication arrangement doubling the use of the broadcast spectrum.
Figure 2:
FIG. 2 depicts a strong self interference in comparison to the weak received signal for a mobile station or user.
Figure 2:
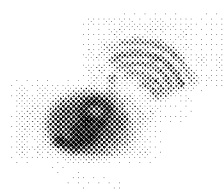

The present invention is directed to method for a four-layer approach in order to enable full duplex operation at a terminal. It is noted that in the discussion below, reference to the self interference caused by local transmission as "noise" or sometimes as "interference" both mean the same. The four layer approach encompasses the following:
 1. Active noise cancellation in the air by generating active interfering signal to combat the effect of interference signal.
 2. Active noise cancellation in RF circuits and transmission lines, e.g., waveguides.
 3. Passive noise cancellation with analog noise canceller circuits.

4. Passive noise cancellation with digital noise canceller algorithms.

The first layer is based on a technique where an active source is added to the system which destructively interferes with the locally transmitted self interference signals at the receive antennas in order to cancel the self interference signal while leaving the received signals (from another transmitter) untouched. Transmission from multiple antennas generates (theoretically) nulls where the received signal power from these antennas are negligible (theoretically zero). Another implementation of the active noise cancellation idea is to use multiple receive antennas instead of multiple transmit antennas and perform the destructive interference cancellation in a waveguide or other forms of RF transmission lines.

Such active noise cancellation using multiple receive antennas is performed in the second layer.

In the third layer, Applicants use RF circuits to transform the received signal in such a way that the self interfering signal is weakened with respect to the intended received signal. This operation is similar to performing noise cancellation in an RF chip and the circuit components used in the implementation of such an RF cancellation algorithm should be very precise and have very low noise figure. This requirement usually forces us to use only passive devices and completely avoid using any active devices such as amplifiers.

The final stage or fourth layer is the passive digital noise cancellation process where we can employ sophisticated steps. However, the isolation (in terms of the output powers) between the intended received signal and the self interfering signal should be enough to make sure that the digitization noise does not masks out the intended signal. It should be pointed out that different layers in our proposed four layer design have different characteristics which make them appropriate only for specific scenarios. For example the use of multiple transmit antennas in the first layer has global effect in the transmission pattern of the transmitted signal at the other nodes that receive this signal. The possibility of employing MIMO in the context of the first layer is also very limited. Hence, one may completely remove the use of this layer in application scenarios which, for example, involve deployment of MIMO systems.

The inventive antenna cancellation by Applicants overcomes the limitations experienced by prior systems. The Applicants invention has the following benefits. 1) The invention overcomes the limitations associated with antenna cancellation in as well as the need for self-interference channel estimation with the help of variable delays and attenuators. 2) The invention allows for both Tx and Rx antenna cancellation techniques to be jointly leveraged, thereby providing two levels of antenna cancellation. This potentially avoids the need for analog cancellation altogether. 3) More importantly, the inventive antenna cancellation lends itself well to scale to MIMO systems. The inventive technique leads to an elegant antenna architecture that allows a combination of both MIMO and FD to be realized in tandem.

Four-Layer Self-Interference Cancellation Method

Layer One: Active Noise Cancellation in the Air

The goal of this layer is to generate an active interfering signal to combat the effect of self-interfering signal transmitted from the same terminal. Instead of transmitting the signal from a single antenna, we consider transmission from a pair of antennas where the transmit power is split between the two antennas. 3 dB power splitters may be used to split the signals sent to the two antennas. In general, due to the limited precision of the RF devices and transmission lines, there might be an amplitude imbalance or phase imbalance at the feeder of the antennas. Moreover, there might be a need to have specific power ratios transmitted from the two antennas. In this case, we use attenuators (and not amplifiers) to make the desired power ratios. In practice it is important to keep the symmetry as much as possible. For example, if an attenuator or a phase shifter is used in one leg, a similar attenuator or phase shifter should be used in the other leg, and so on.

Consider transmission at the center frequency $f_o$ that corresponds to the wavelength $\lambda$. If we consider a point where the distance between this point and the first transmit antenna, say $d_1$ is exactly an odd multiple of $\lambda/2$ away from the distance between this point and the second transmit antenna, say $d_2$, then the transmission from these two local antennas will destructively interfere at this point, hence, the received power from the local transmit antennas would be negligible. We call the locus of the points such that $$|d_1 - d_2| = k\lambda = \lambda/2$$

for some k, as the potential-null-points. The term potential-null-point refers to the fact that these points could be made null (i.e., the receive power from the local transmit antennas would be negligible) if proper power ratio between the transmit signals from the antenna pair is chosen, however, any other point in the space may have non-negligible power residue irrespective of the power ratios chosen.

Two notes are in order here. First, the power of the signal received at the interfering point from each antenna depends on the distance $d_i$, i=1, 2. Therefore, even if we use very precise components and a symmetrical system, if the signal power at each of the transmit antennas is the same, it is not possible to get a complete null at any such point. In other words, it is necessary to control the power transmitted from the antennas to choose an appropriate power ratio in order to create a null at any potential null locus point. Second, it might not be possible to choose several points from the set of potential-null-points and achieve a null at all of these points due to the fact that the power ratio has to be chosen differently. This has direct effect on the possibility of using MIMO with this technique, because, for example, when the received antenna array is selected, each antenna is constrained to be placed at one of the null points. The scenario of using multiple transmit antennas is even more constrained in the placement of these antennas.

A nice consideration is to force the distance between the transmit antennas to be an odd multiple of $$\lambda/2$$

itself, in addition to the condition on the potential null points, (i.e., $$|d_1 - d_2| = k\lambda = \lambda/2,$$

for some k). Given an extra condition on the spacing between the transmit antennas to be an odd multiple of $$\lambda/2,$$

any point on the line connecting the transmit antenna pairs (with the exception of the points in between the antennas) will be a potential null point. The fact that we can have the set of potential null points on a straight line is very important because it would facilitate the design of MIMO transmit and receive antenna arrays.

It is also possible to add phase shifters to each signal path (after the power splitter) at the transmit antennas in order to generate a phase shift between the transmitted signals from the antenna pairs. In such cases we would use the same phase shifter in each path in order to make the system symmetrical. If a phase shifter is added to the transmit antenna paths, then the locus of the potential null points will change. In general, the locus of potential null points is a set of hyperbolas and two possible lines, one being the line passing through the base of the antenna pairs (more precisely, considering the plane orthogonal to both dipole antennas, this is the line in this plane which passes through the points where the dipole intersects with this plane) and the other is the perpendicular bisector of the line connecting the bases of the antennas. In fact only if we use a phase shift of exactly $\pi$ between the signal transmitted from the antenna pairs will the perpendicular bisector of the line connecting the antenna bases will be in the locus of potential-null-points. Moreover, with $\pi$ phase shift between the signal transmitted form the antenna pairs, we need to make the distance between the antenna pairs an even multiple of $$\lambda/2$$

or simply an integer multiple of $\lambda$ in order to have the points on the line passing through the antenna bases as the potential-null-points.

It should be pointed out that the perpendicular bisector has another special property. If we consider the locus of the points for which the gain of the received signal from each of the antennas are the same for any given transmit power ratio between the antenna pairs, then the only case in which this locus is a straight line is when the ratio is exactly one which means that the transmit power from each antenna is exactly the same, i.e., just an ideal or close to ideal power splitter should be used. More interestingly, it turns out that this locus is exactly the perpendicular bisector of the line connecting the antenna bases. In other words, if an antenna pair is exactly an integer multiple of $\lambda$ apart and the transmitted signal from two identical antenna pairs are exactly an odd multiple of $\pi$ degrees out of phase and have exactly the same amplitude, then we have null points on the perpendicular bisection of the line connecting the base of the antennas. This situation is in fact very desirable because we can place all receive antennas at the points on this locus and have multiple received antennas as a ULA (Uniform linear array) as it is currently used in practice.

Although we consider transmission from a pair of antennas to cancel self interference, it should be kept in mind that it is possible to consider transmission from more than two antennas and using these signals to cancel the self interfering signal. However, here we only focus on a pair of transmit antennas for the purpose of active noise cancellation in this layer, as we believe this will be a configuration which will minimize the adverse effect caused by the precision of devices used for this purpose. In general, we should avoid introducing any new component into the RF chain unless there is a clear benefit from it. A solution with more than two antennas can be easily constructed using the two antenna solution we have presented.

Layer Two: Active Noise Cancellation in RF Circuits and Transmission Lines

The goal of this layer is similar to the first layer but instead of generating active interfering signal to combat the effect of self-interfering signal transmitted from the same terminal, we aim to generate the destructive superposition of the signals using RF circuits and transmission lines. Therefore, instead of focusing on generating multiple transmissions to generate destructive interference in the air, we focus on multiple reception points to receive a locally transmitted signal and guiding the received waveforms using transmission lines to cancel the self interfering signal while the signal from the other transmitter (which contains the intended receive signal) remain minimally affected or not affected at all. We consider reception from a pair of antennas while is should be kept in mind that it is possible to consider reception from more than two antennas and using these signals to cancel the self interfering signal. However, here we only focus on a pair of received antennas for the purpose of active noise cancellation in this layer, as we believe this will be a configuration which will minimize the adverse effect caused by the precision of devices used for this purpose. A solution with more than two antennas can be easily constructed using the two antenna solution we present here.

Using similar antenna pairs, the received signal at one antenna at a specific frequency is similar to the received signal at the other antenna up to a proper power (or amplitude) scaling and a phase shift. This assumption is true only in the near field where the distance between the transmit and receive antennas are close enough that we can ignore the effect of multipath and the transmitted signal obeys the free-space propagation with good approximation.

Therefore, it is enough to make the received signals out of phase by exactly $\pi$ and by using proper attenuation make the signal powers the same. It is then possible to cancel out the undesired self-interference using a combiner/adder. It should be pointed out that an RF combiner might have amplitude or phase imbalance at different frequencies, therefore, it is very critical to find the device that works well at the center frequency of the signal and the intended transmission bandwidth has minimal power and phase imbalance.

Consider transmission from a single antenna at the center frequency $f_o$ that corresponds to the wavelength $\lambda$. If we consider a point where the distance between this point and the first receive antenna, say $d_1$ is exactly an odd multiple of $\lambda/2$ away from the distance between this point and the second received antenna, say $d_2$ then at the combiner the received signal from these two antennas will destructively interfere, hence, the received power from the local transmit antenna would be negligible especially if the received signal amplitude (or power) at the two receive antennas are very close. Similar to the case of multiple transmit antennas, we call the locus of the points that the single transmitter can be located such that $$|d_1 - d_2| = k\lambda = \lambda/2,$$

for some k, as the potential-null-points.

We note that there is a striking duality between the potential-null-point for the transmit antenna pair (in the solution proposed in the first layer) and received antenna pair based solution in this (second) layer. Similar to the case of active noise cancellation using transmit antenna pair, we note that a power scaling might be needed to create active noise cancellation in the RF circuit in this layer. This power scaling generally depends on the location of the transmit antennas and hence the use of a transmit antenna array to achieve a MIMO configuration becomes hard or not even possible if a proper design is not followed.

Similar to the case of interference cancellation using transmit antenna pair in the first layer, a notable case is when all the transmit antennas are located in a single line. For now, assume that the first layer active noise cancellation solution is not implemented. Let us call the plane that is perpendicular to the antenna dipole as the transmission plane and assume that the bases of the received antennas are in the same plane. For any received antenna on one side of the plane we consider another point on the other side at the position that is symmetric with respect to the line where the transmit antennas are located; assume another receive antenna at this point that is paired with the first receive antenna. In this case, for the near field, the received signal, transmitted from any transmit antenna, would be similar at these two receive antennas. Therefore it is enough to generate the right phase shift of $\pi$ between these two signals in order to cancel them at the combiner. In this case it is very simple to have multiple transmit antennas located in a single line and multiple pairs of receive antennas where each antenna of a pair is located symmetrically on either side of the transmit antenna array line. Let y denote the received signal after the combiner and $y_1$ and $y_2$ denote the received signals at the pair of receive antennas. While this setup removes the self interference by effectively performing a subtraction $y=y_1-y_2$, it does not adversely affect the far field signal (from the transmitter which transmits the signal which is the intended signal at the terminal under consideration). In particular, for the well known Rayleigh fading model, the contribution of the transmit signal x from a far field to the received signal at the pair of receive antennas may be written as $$\begin{bmatrix} y_1 \\ y_2 \end{bmatrix} = \begin{bmatrix} h_1 \\ h_2 \end{bmatrix} x + \begin{bmatrix} z_1 \\ z_2 \end{bmatrix}$$

Hence, the contribution of this signal after combiner is $y=(h_1-h_2)x+z_2-z_2=\tilde{h}x+\tilde{z}$. Clearly, $\tilde{h}$ is circularly symmetric complex Gaussian $CN(0,\sqrt{2})$ if $h_i\sim CN(0,1)$, $i=1, 2$ and $h_i$'s are independent. Similarly, the noise is $\tilde{z}\sim CN(0,\sqrt{2})$ if $z_i\sim CN(0,1)$, $i=1, 2$ and $z_i$'s are independent. Therefore, the received signal from the pair of antennas remains unaffected meaning that the signal to noise ratio is not different and the fading characteristics is also the same. It should be pointed out that other channel fading models may need special treatment.

The duality between the transmit antenna active noise cancellation and receive antenna active noise cancellation can be stated as follows. If the role of transmit and receive antenna is reversed and the 3 dB power splitter is replaced with a perfect power combiner, then the locus of the potential-null-points remains the same for any fixed power attenuation and phase shift values.

Here, we summarize the useful configurations of transmit and receive antenna and their respective conditions. In the following d-separated, odd-$\lambda/2$-separated and even-$\lambda/2$-separated means that the pair of antenna are separated by an arbitrary distance d, a distance d that is an odd multiple of $\lambda/2$, or a distance d that is an even multiple of $\lambda/2$ or simply an integer multiple of $\lambda$. Also, $\pi$-lagged, $\alpha$-lagged and synchronized means that the signal at the pair of antennas are exactly out of phase by $\pi$, an arbitrary value $\alpha$, or completely synchronized. In general, we use the following setup. For a pair of antennas, we consider a power attenuator and a phase shifter for each antenna and assume that they are fed by a 3 dB power splitter if they are transmit antenna pairs or their signal is combined with an equal gain combiner if they are receive antenna pairs. Obviously, if there is no need for power adjustment, the attenuators will be removed and similarly if there is no need for phase adjustment, the phase shifters will be removed.

The locus of potential-null-points consists of a family of hyperbola each of which have the bases of the antenna pairs as its focal points. Each hyperbola intersects with the traverse axis, i.e., the line joining the focal points, at a single point that satisfies $$d_1 - d_2 = k\lambda + \left(1 - \frac{\delta}{\pi}\right)\frac{\lambda}{2}$$

where $d_1$ and $d_2$ are the distances from the intersection points to the focal points, $\delta$ is the phase lag between the antenna pairs and k is an arbitrary integer number.

d-Separated $\pi$-Lagged Transmitters

It is clear that if and only if there is a phase lag $\delta=\pi$ then it is possible to have the equality $d_1=d_2$ to satisfy the null point condition. In this case, for any distance d between the antenna pairs, the perpendicular bisector of the traverse line connecting the antenna base is the potential-null-point. As discussed earlier in the first layer solution section, same power ratio is required to have null points over the entire line. Therefore this setup is the most interesting design choice.

Figure 4:
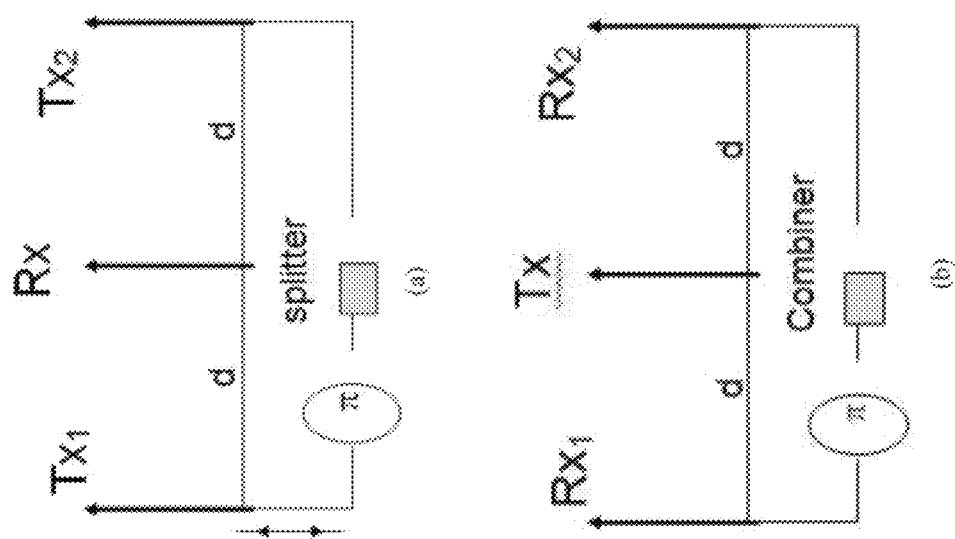
FIG. 4 depicts antenna cancellation, (a) receiver cancellation and (b) transmit cancellation, in accordance with the invention.

A nice consideration is to force the distance between the transmit antennas to be an odd multiple of $\lambda/2$ itself, in addition to the condition on the potential null points, i.e., $$d_1 - d_2 = k\lambda + \frac{\lambda}{2},$$

for some k. FIG. 1 and FIG. 4 of Applicant's U.S. Provisional Application No. 61/422,303, illustrate the locus of potential-null-points and also compares the effect of having the extra condition that the spacing between the transmit antennas be an odd multiple of $$\frac{\lambda}{2}.$$

Under this latter condition, any point on the line connecting the transmit antenna pairs (with the exception of the points in between the antennas) will be a potential null point. The fact that we can have the set of potential null points on a straight line is very important because it would facilitate the design of MIMO transmit and receive antenna arrays.

It is also possible to add phase shifters to each signal path (after the power splitter to the transmit antennas) in order to generate a phase shift between the transmitted signals from the antenna pairs. In such cases we would use the same phase shifter in each path in order to make the system symmetrical. If a phase shifter is added to the transmit antenna paths, then the locus of the potential null points will change. In general, the locus of potential null points is a set of hyperbolas and two possible lines, one being the line passing through the base of the antenna pairs (more precisely, considering the plane orthogonal to both dipole antennas, this is the line in this plane which passes through the points where the dipole intersects with this plane) and the other is the perpendicular bisector of the line connecting the bases of the antennas. In fact only if we use a phase shift of exactly π between the signal transmitted from the antenna pairs will the perpendicular bisector of the line connecting the antenna bases be on the locus of potential-null-points. Moreover, with n phase shift between the signal transmitted from the antenna pairs, we need to make the distance between the antenna pairs an even multiple of $$\frac{\lambda}{2}$$

or simply an integer multiple of λ in order to have the points on the line passing through the antenna bases as the potential-null-points.

It should be pointed out that the perpendicular bisector has another special property. If we consider the locus of the points for which the gain of the received signal from each of the antennas are the same for any given transmit power ratio between the antenna pairs, then the only case for which this locus is a straight line is when the ratio is exactly one which means that the transmit power from each antenna is exactly the same, i.e., just an ideal or close to ideal power splitter is used. More interestingly, it turns out that this locus is exactly the perpendicular bisector of the line connecting the antenna bases. In other words, if an antenna pair is exactly an integer multiple of λ apart and the transmitted signal from two identical antenna pairs are exactly an odd multiple of π degrees out of phase and have exactly the same amplitude, then we have null points on the perpendicular bisection of the line connecting the base of the antennas. This situation is in fact very desirable because we can place all receive antennas at the points on this locus and have multiple received antennas as a ULA (Uniform linear array) as it is currently used in practice.

Passive Noise Cancellation with Analog Noise Canceller Circuits

The signal out of the first layer may still contain considerable self-interfering signal. However, application of each of the above active noise reduction technique reduces the gap between the power of self interference signal and the desired signal. The idea of passive noise cancellation is to cancel the residual self interference signal by subtracting the attenuated version of the locally transmitted signal from the received signal in several stages by minimizing the output power at each stage.

Passive Noise Cancellation with Digital Noise Canceller Algorithms

If the difference in the power of the desired signal and the contaminating self interference signal in the received signal is low enough it is possible to perform digitization of the received signal without masking out the intended received signal by digitization noise. Hence, one can perform a more sophisticated digital noise cancellation scheme to adaptively cancel out the reminder of the self-interference signal. Alternatively, one may leave out the interference, but try to accurately estimate its parameters and exploit a more advanced receiver technique.

Antenna Placement for Performing Antenna Cancellation

Here, we provide some specific antenna placement strategies for the antenna cancellation methods discussed in the previous sections. We first note that there is a duality with respect to the transmit antenna cancellation and receive antenna cancellation techniques. More precisely, consider a transmit antenna placement where the antennas are fed with input signals after a specific gain and phase shift. This placement generates nulls at specific locations in space. Let us call these null points as the transmit null points which means that when the transmission with the mentioned phase and gain adjustment is performed from the transmit antennas, the received power is substantially low at these points. Now, change the role of the transmit antennas to the receive antennas and apply the exact same phase and gains in the receive path and combine the signals. The combined signals would be substantially low if the transmission happens from the receive null points. Duality states that the receive null points are exactly the same as the transmit null points when you change the role of the transmit antennas and the receive antennas. It can also be proved that the far field effect of the antenna configuration in the reception of the intended receive signals where the receive antenna cancellation technique is used is exactly the same as its effect on the transmitted signal where the transmit antenna configuration is used.

In general, we may consider either the receive antenna cancellation technique or transmit antenna cancellation technique or both simultaneously. Consider a reference antenna in the array and assume that all other antennas are positioned on one side of this antenna in a line and the distances of the other antenna elements from the reference antenna element are $d_1 < d_2 < \ldots < d_{M-1}$ for an M antenna case. Let us use the index $0, 1, 2, \ldots, M-1$ for the antennas (from the reference antenna), starting with the first antenna, until the $(M-1)^{th}$ antenna. We denote the phase shift (with respect to a center frequency, or the phase may be specified as the amount of the time delay irrespective of the frequency) and the amplitude of the $k^{th}$ antenna with respect to the reference antenna by $\Phi_k$ and $\alpha_k$, respectively. In practice the phase adjustment could be enabled by using a phase shifter and the amplitude adjustment could be enabled by using an attenuator. Let us consider multiple examples of antenna configurations in the following. In the examples we consider two antennas only. In one example an antenna configuration may be a linear array which is not necessarily ULA (Uniform linear array). Please note that potential null point means the point at which the signals received from the two antennas are exactly out of phase by an odd multiple of π whereas the null point is the point in which for the given antenna gains, the actual received signal is significantly low in power.

d-Separated π-Lagged Antenna Placement

In this configuration, the locus of potential null points always includes the perpendicular bisector of the connecting line between the base of the two antennas. In fact this whole line (perpendicular bisector) is part of the locus only if we have a pair of π-lagged antennas. A very interesting property of these potential null points is that they all are null points if the gains of both antennas are similar. Please see FIG. 1 and FIG. 4 of Applicant's U.S. Provisional Application No. 61/422,303 isonal Application No. 61/422,303.

Even-(λ/2)-Separated π-Lagged Antenna Placement

In this configuration the locus of potential null points also includes the whole line connecting the base of the two antennas with the exception of the points in between the two antennas where only a few discrete points as discussed before are the potential null points. Please see FIG. 1 Applicant's U.S. Provisional Application No. 61/422,303.

Odd-($\lambda$/2)-Separated Zero-Lagged Antenna Placement

This situation is similar to the case of $$\text{eve-}\frac{\lambda}{2}\text{-separated}$$

Figure 3:
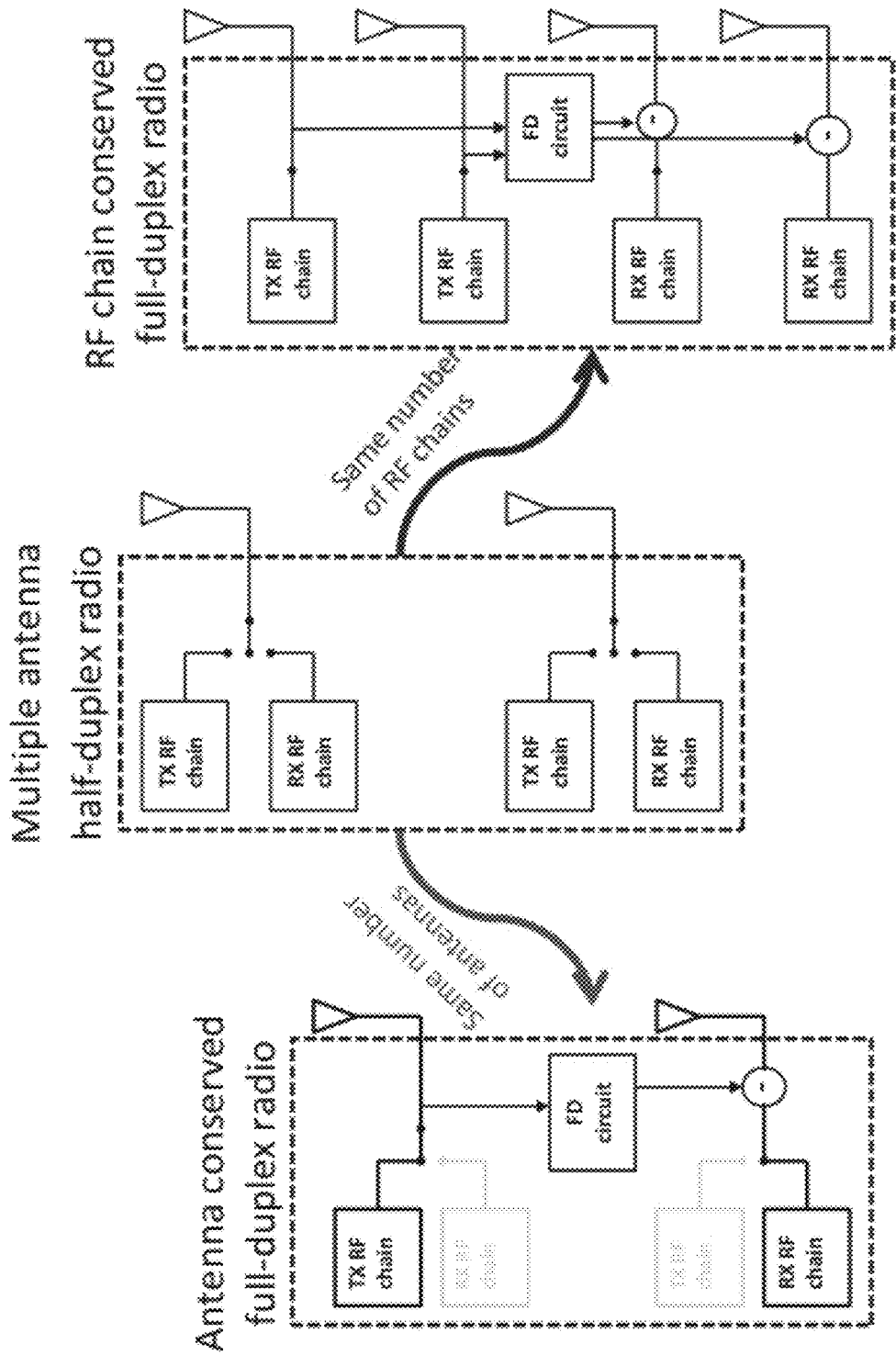
FIG. 3 depicts an antenna deployment scenario with the same number of transmit and receive RF chains.

$\pi$-lagged antenna placement. In this configuration the locus of potential null points also includes the whole line connecting the base of the two antennas with the exception of the points in between the two antennas where only a few discrete points as discussed before are the potential null points. Please see FIG. 3 of Applicant's U.S. Provisional Application No. 61/422,303.

d-Separated $\alpha$-Lagged Antenna Placement

For any value of d one can always find a value of $\alpha$ for which the locus of potential null points includes the whole line connecting the base of the two antennas with the exception of the points in between the two antennas. Please see FIG. 1 and FIG. 3 of Applicant's U.S. Provisional Application No. 61/422,303.

Antenna Configurations in More Detail

Here we further consider specific antenna configurations in more detail. First, we note that if only transmit or receive antenna cancellation is used, any of the antenna placement strategies discussed in the previous section may be used. However, two placements are more desirable. One is the d-separated $\pi$-lagged antenna placement for which the gain of both antennas are the same and therefore there is no need for attenuators or amplifiers. This configuration also enhances the far field effect of the antenna cancellation technique in comparison to the use of a single antenna.

When both transmit and receive configurations are to be used simultaneously in a system, several combinations of the above antenna placement configurations can be used. In the following we consider a few particular antenna configurations.

Single Axis Transmit Antenna Cancellation or Receive Antenna Cancellation

Figure 8:
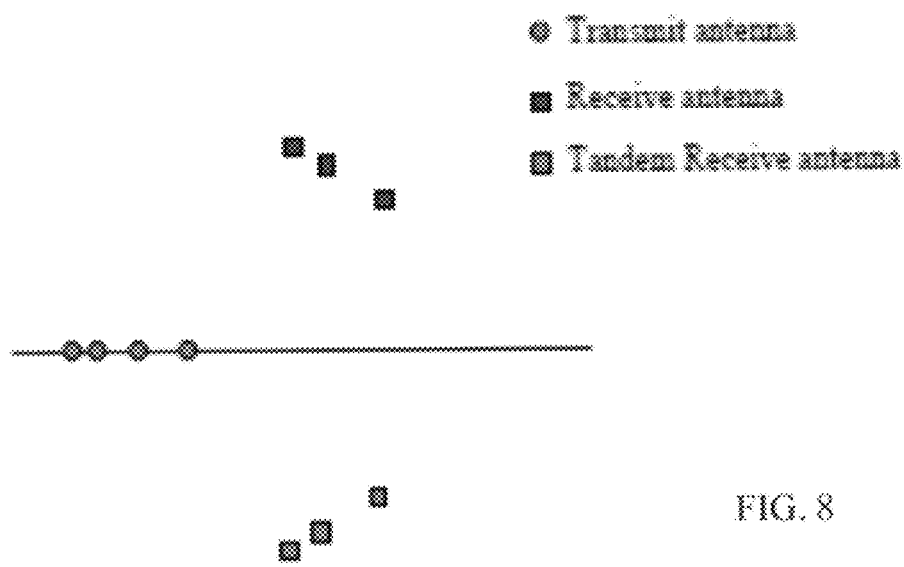
FIG. 8 depicts a first exemplary antenna configuration, in accordance with the invention.
Figure 9:
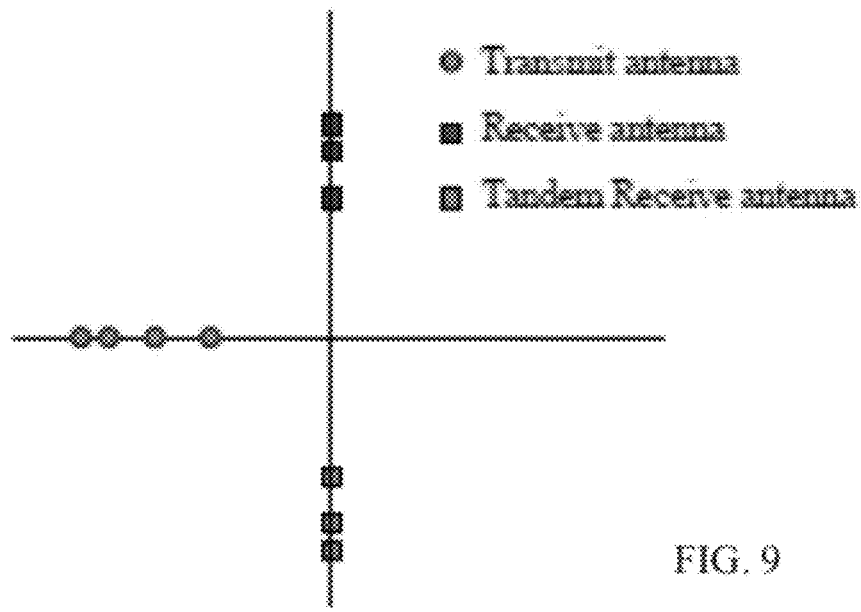
FIG. 9 depicts a second exemplary antenna configuration, in accordance with the invention.

If we place any number of multiple transmit antennas on the same line or axis, then it is possible to place the receive antennas at any point in the plane of transmission but not on this same axis. Please see FIG. 8 of the present application. Then we need to add at least one extra receive antenna for each original receive antenna for the purpose of antenna cancellation. The position of this tandem antenna is the symmetric point with respect to this axis. There is no constraint on the receive antennas to be on the same side of this axis or be on the same line. Please see FIG. 9, of the present application, for an alternative example. Please note that transmit and receive antennas can be interchangeably placed in FIG. 8 and FIG. 9. Thus, a dual of the configurations shown in these figures lead to the same effect and can be used as well.

Orthogonal Axis Transmit and Receive Configuration

Figure 10:
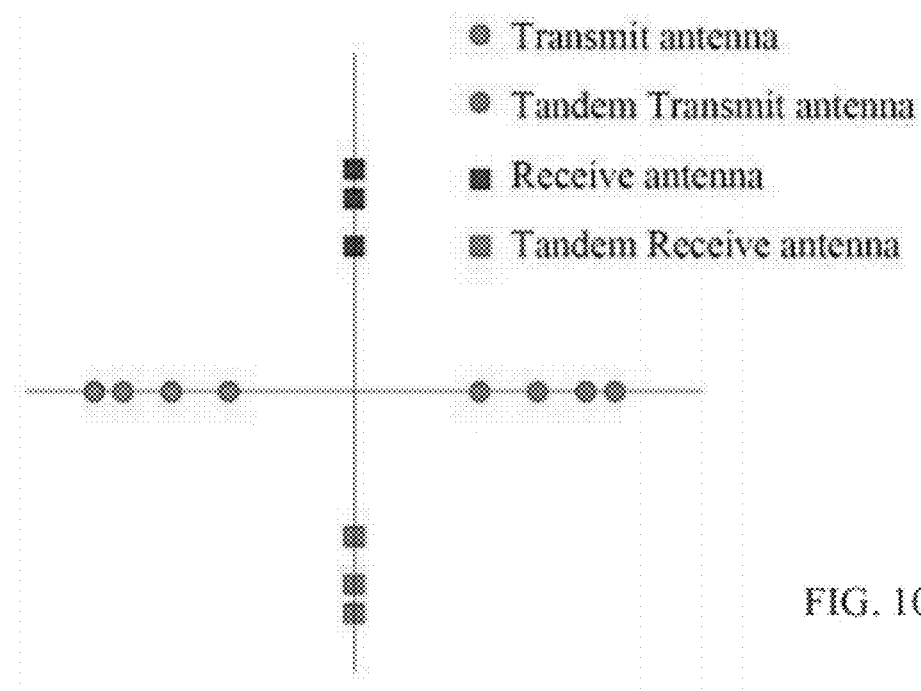
FIG. 10 depicts a third exemplary antenna configuration, in accordance with the invention.

In this configuration, we consider two orthogonal axis where the base of transmit antennas will be placed in one axis and the base of the received antennas are placed in the orthogonal axis. Let the cross section of these two lines be denoted as center point. We can consider any number of multiple antennas say M and place them on one axis. To enable antenna cancellation we need to add at least one antenna for each of the original antennas. In one configuration, for each antenna, we add one antenna on the same axis and place it in the position that is symmetric with respect to the center point and we call this antenna the tandem antenna. Please note that we have the restriction that the original set of antennas should not be such that a pair of the antennas out of the M original antennas are in symmetrical position with respect to the center point. If for all the transmit and receive antennas in the two axes we add the tandem antennas and we use a $\pi$ degree phase shift between each antenna and its tandem antenna, then there is no need for any attenuator and we achieve simultaneous transmit and receive cancellation. Please see FIG. 10 of the present application.

Inline Axis Transmit and Receive Configuration

In this configuration, we consider only a single axis where the base of both transmit and receive antennas will be placed on this axis. We can consider any number of multiple receive antennas say $M_R$ and place them on this axis. We also consider any number of multiple transmit antennas say $M_T$ and place them on the same axis. To enable antenna cancellation, we need to add at least one antenna for each of the original antennas. In one configuration, for each antenna, we add one antenna (called the tandem antenna) on the same axis and place it in the position such that these two antennas are exactly odd multiple of $$\frac{\lambda}{2}$$

away from each other. However it is usually better to choose the distance exactly equal to $$\frac{\lambda}{2}.$$

Therefore, it is desirable that the original set of antennas do not have a pair of the antennas at a distance of $$\frac{\lambda}{2}.$$

Figure 11:
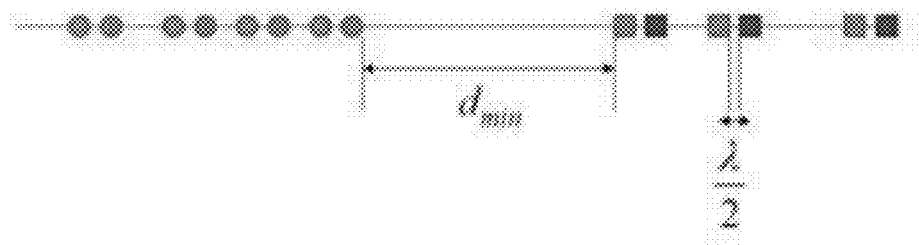
FIG. 11 depicts a fourth exemplary antenna configuration, in accordance with the invention.

If for all the transmit and receive antennas we add the tandem antennas and place the set of transmit and receive antennas and their tandem antennas at a minimum distance $d_{min}$ then we achieve simultaneous transmit and receive cancellation. Please note that the larger the $d_{min}$, the more cancellation will be achieved and there is no need for further gain or phase adjustment for the antenna pairs and we can eliminate the use of both attenuators and phase shifters for all pairs. However, for small separation distance $d_{min}$ it could still be beneficial to use some gain and phase adjustment. Please see FIG. 11.

The Case for Symmetric Antenna Placement

Applicants now present inventive antenna cancellation approach which is based on a symmetric placement of the antennas. FIG. 4(a) illustrates our Rx antenna cancellation, where two Rx antennas are placed symmetrically at a distance d from the Tx antenna. The signal received from one of the receive antennas is phase shifted internally using a fixed $\pi$ phase shifter before being combined with the other receive signal to help nullify the self-interference signal. Note that only two RF chains are required—one for Tx and one for Rx.

Similar to Rx antenna cancellation, we can also have an analogous Tx antenna cancellation as shown in FIG. 1(b). While the basic antenna configuration for cancellation is simple, we now highlight its significant potential to address the limitations of existing FD schemes. More importantly, we show how it can be extended to two levels of antenna cancellation and leveraged in tandem with MIMO—previously not addressed in the literature.

Advantages of Symmetric Antenna Placement

Compared to the transmit antenna cancellation in prior works noted hereinabove, where the $\pi$ phase shift was realized with asymmetric placement of Tx antennas $$\left(d \text{ and } d + \frac{\lambda}{2}\right),$$

the inventive approach has the following advantages.
1) Bandwidth Dependence: Moving the $\pi$ phase shift internally alleviates the bandwidth dependence (due to $\lambda$) of antenna cancellation. Further, fixed $\pi$ phase shifters have significantly better frequency responses over wide bandwidths compared to variable ones.
2) Tuning: Since the received powers are similar, this also avoids the need for tuning of attenuation and phase of the self-interference signal; otherwise required to counteract the received power difference due to asymmetric antenna placement between antennas due to the imbalance between the antennas.

Further, unlike prior techniques, the present inventive approach does not require estimation of the self-interference channel between Tx and Rx antennas and hence the need for variable attenuators and delay lines. The prior technique uses a BALUN to generate a $\pi$ phase shift internally. However, in the absence of antenna cancellation, this is not sufficient and variable attenuators and delay lines or tunable RF cancellation circuits are needed to compensate for the self-interference channel.

While the inventive approach has the above benefits, two other limitations were raised with respect to antenna cancellation in prior works. Applicants now explain the reasons, why Applicants believe these limitations do not hold in practice. One limitation, raised with respect to symmetric antenna cancellation, is its impact on far field signals. The prior work advocated the use of asymmetric Tx antenna spacing (instead of internal phase shifter) to generate the required phase shift of $\pi$ between the transmit signals owing to its ability to cause less destructive interference in the far field. However, the simulations used to highlight this observation relied on a free space path loss model for the far field which does not hold in reality. While the self-interference channel can be modeled as free space, it is well known that the far field channels (indoors or outdoors) from the transmit antennas experience independent (Rayleigh) fading at any far field receive point.

Hence, asymmetric antenna spacing does not provide any advantage over a symmetric placement (with internal phase shifter) with respect to impact on far-field. Analogously, in our symmetric receive antenna cancellation (with an internal $\pi$ phase shifter), while the received signals from the node's own transmit antenna experiences a free space channel, it experiences independent fading when the transmit signal is generated from a far field point. It is important to understand how it compares to a 3×3 MIMO system given the use of additional antennas as well as the impact of antenna cancellation on desired signals from the far field.

Comparison with MIMO

In general, antenna cancellation requires an extra antenna which the prior work believed may not be justifiable compared to a 3×3 MIMO system. Note that MIMO transmissions require each antenna to have a Tx/Rx RF chain, which is not the case here; antenna cancellation merely requires an extra passive antenna element together with a fixed phase shifter and the overhead is not comparable to a MIMO system. If at all any comparison should be made, it should be with a 2×2 MIMO system which the prior work noted the following: practical systems require two RF chains per antenna, one for Tx and one for Rx; thus a comparison with a 2×2 MIMO system may not be justifiable either.

Note that in a N×N MIMO system, each node employs N number of RF chains, which makes it possible to transmit/receive N streams. However, in the inventive FD system, Applicants use only two RF chains as the two Rx antennas are combined before the use of the RF chain. Given that antennas are relatively inexpensive compared to RF chains, the true comparison is only against a 2×2 MIMO system and not a 3×3 system. Hence, comparison of a 2 stream FD system (one transmit and one receive streams) against a 2×2 MIMO system is not specific to antenna cancellation but is relevant to all FD systems. The comparison would depend on the environment, channel access model, etc. and is not the focus of this application.

In particular, for the well known Rayleigh fading model, for a transmit signal x from far field, the received signal at the pair of receive antennas can be written as:

$$\begin{bmatrix} y_1 \\ y_2 \end{bmatrix} = \begin{bmatrix} h_1 \\ h_2 \end{bmatrix} x + \begin{bmatrix} z_1 \\ z_2 \end{bmatrix}$$

The contribution of this signal after combining is $y=(h_1-h_2)x+z_2-z_2=\tilde{h}x+\tilde{z}$. Clearly, $\tilde{h}$ is circularly symmetric complex Gaussian $CN(0,\sqrt{2})$ if $h_i \sim CN(0,1)$, $i=1, 2$ and $h_i$'s are independent. Similarly, the noise is $\tilde{z} \sim CN(0,\sqrt{2})$ if $z_i \sim CN(0,1)$, $i=1, 2$ and $z_i$'s are independent. Therefore, the received signal from the pair of antennas remains unaffected meaning that the signal to noise ratio is not different and the fading characteristics is also the same.

While addressing limitations is critical; what is more important is to see if the inventive approach can (i) provide additional RF cancellation by coupling both transmit and, receive antenna cancellation to remove the dependence on self-interference channel estimation and hence analog cancellation, and (ii) extend to operate in tandem with MIMO systems. Before answering these questions, Applicants now provide a brief discussion on some of the properties pertaining to antenna cancellation, that will be leveraged in our extension to two level cancellation as well as MIMO.

Understanding Antenna Cancellation

To leverage antenna cancellation effectively, it is important to understand the notion of signal nulling. A signal is said to be "nulled" when two copies of the signal add $\pi$ out of phase to cancel each other, thereby pushing the received signal strength to or below the noise floor. Let us consider transmit antenna cancellation for explaining the concepts.

There are two parameters affecting the nulling process: relative phase and amplitude of the transmitted signals at the receiver. The relative phase between the two signals could be further controlled either by directly introducing a phase offset ($\phi$) to one of the signals and/or by varying the relative distance between the transmit antennas with respect to the receive antenna on the line joining the two transmit antennas.

First, we will consider only the set of potential receive null points that can be realized by controlling the relative phase. Whether these null points can be realized in turn depends on the relative amplitude of the signals as well, which is discussed subsequently. Now the set of potential null points in a two dimensional plane can be characterized by the following three cases (See FIG. 5(a)).

1) $\phi=\pi$: When one of the transmit signals is phase shifted by $\pi$, then the loci of the receive points where a potential null can be realized is exactly the perpendicular bisector (PB) of the line joining the transmit antennas $$\left(\text{i.e. } d_1 = d_2 = \frac{d_t}{2}\right)$$

2) $\phi=\pi$, $|d_1-d_2|=k\lambda$: When the receive point is moved $$\frac{k\lambda}{2},$$

$k \in Z$, $\geq 1$ from the mid-point towards either one of the transmit antennas, then we have $|d_1-d_2|=k\lambda$. In these cases, the potential null points are given by hyperbolas that pass through the receive point in addition to the PB.

3) $\phi=\pi$, $|d_1-d_2|=k\lambda$, $d_t=m\lambda$: In addition to those from the above two cases, all points on the line joining the two transmit antennas also contribute to the set of potential null points.

Let $d_t$ be the distance between the two Tx antennas, with $d_1$ and $d_2$ denoting the distance of the two transmit antennas with respect to a receive point respectively. First, we consider the set of potential receive null points, where there is a phase offset $\phi$. Whether these null points can be realized in turn depends on the relative amplitude of the signals as well, which is discussed subsequently. Now the set of potential null points in a two-dimensional plane can be defined as the locus of the points satisfying $|d_1-d_2|=k\lambda$ for some integer k and includes the following (See FIG. 5(a)).

1) The perpendicular bisector (PB) of the line joining the transmit antennas $$\left(\text{i.e. } d_1 = d_2 = \frac{d_t}{2}\right).$$

2) A set of hyperbolas with the transmit antennas as the focal points. Each hyperbola intersects the line connecting the two transmit antennas at points that are $$\frac{k\lambda}{2},$$

$k \in Z$, $\geq 1$ from the mid-point towards either one of the transmit antennas.

3) If $d_t=m\lambda$, in addition to the above points, all points on the line passing through the two transmit antennas besides those lying in between them also contribute to the set of potential null points.

Figure 5:
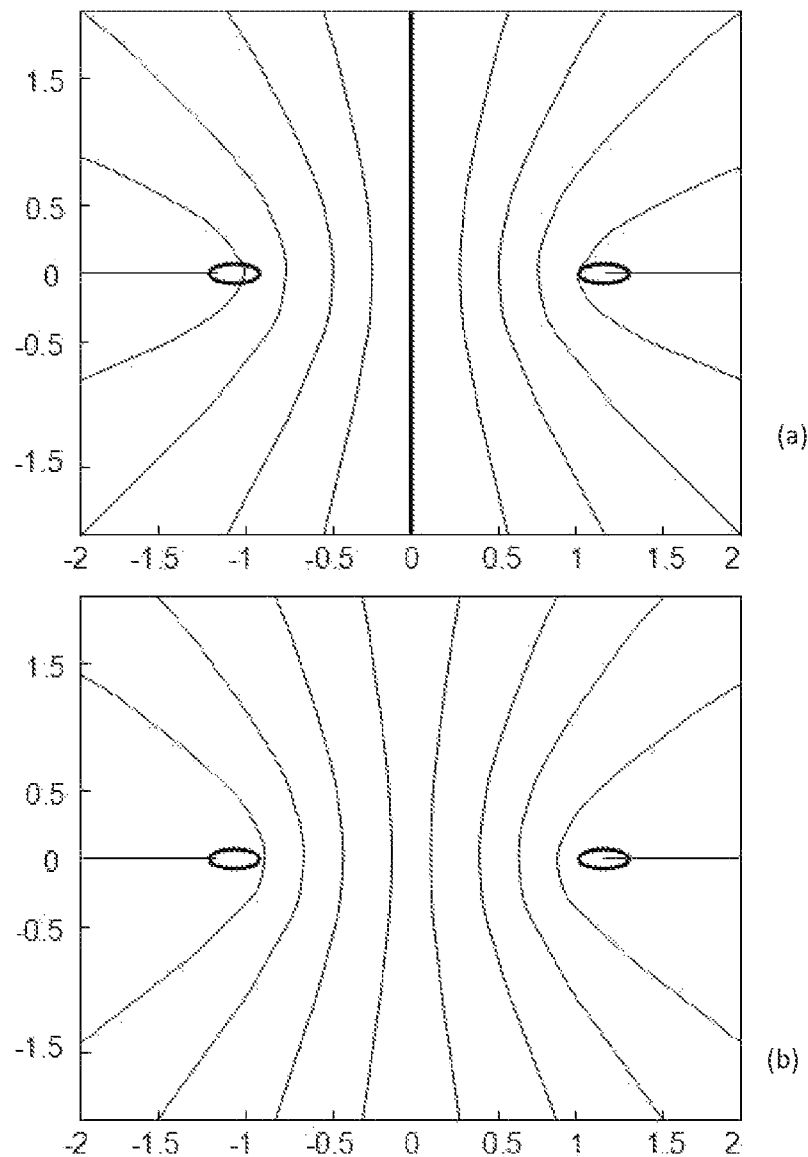
FIG. 5 depicts loci of null points for (a) phase offset+ antenna spacing and (b) only antenna spacing, in accordance with the invention.

To understand scenarios where relative phase is controlled only with the help of antenna spacing (i.e. phase offset, $\phi=0$), we note that the locus of the potential null points is now defined as those satisfying $$|d_1 - d_2| = \frac{k\lambda}{2}$$

and consist of (see FIG. 5(b)),

1) A set of hyperbolas with the transmit antennas as the focal points. Each hyperbola intersects the line connecting the two transmit antennas at points that are $$\frac{(2k+1)\lambda}{4},$$

$k \in Z$, $\geq 1$ from the mid-point towards either one of the transmit antennas.

2) If $$d_t = \frac{(2m+1)\lambda}{2},$$

in addition to the above points, all points on the line passing through the two transmit antenna besides those lying in between them also contribute to the set of potential null points.

Now for a potential null point to be realized, the two transmit signals must arrive at the receive point with equal amplitude but $\pi$ out of phase. Due to symmetry, this can be easily achieved on the PB with an equal transmit power from the two transmit antennas. Hence, all null points on the PB are realizable. However, for a null point on a hyperbola, it is easy to see that different transmit powers will be required from the two transmit antennas. Further, this will vary from one point to another on the same hyperbola as well as across hyperbolas. Hence, for a fixed (potentially different) transmit power from the two transmit antennas, at most two null points on each hyperbola may be realizable. Note that we do not have null points on the PB when $\phi=\pi$. Given that the null points on the hyperbolas are hard to realize, this limits the applicability of asymmetric antenna spacing based approaches (to two level antenna cancellation; this limitation is compounded in the case of MIMO.

This important property of realizing null points on the PB when transmit signals are phase shifted by $\pi$ is leveraged later for two purposes: (1) extend the transmit antenna cancellation to a two-level transmit and receive antenna cancellation scheme, and (2) to realize FD communication in tandem with MIMO.

This in turn indicates the relative ease with which null points can be realized on the PB by controlling the phase offset $\phi$ as opposed to those on the hyperbolas that are realized from antenna spacing. Note that realizing null points on a straight line is very important because it facilitates the design of MIMO transmit and receive antenna arrays. This will be leveraged later to extend our scheme to incorporate a two level transmit-receive antenna cancellation along with MIMO.

Two Level Cancellation with MIMO

Figure 6A:
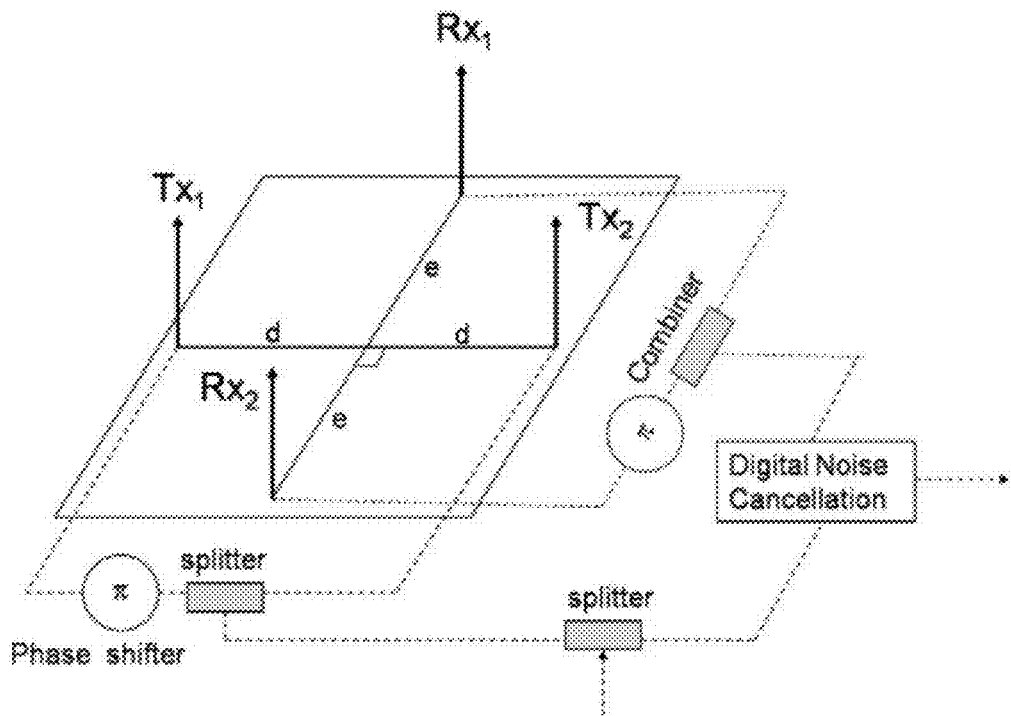
FIG. 6 depicts two level antenna cancellation for (a) two level placement and (b) imprecise placement, in accordance with the invention.

Given that the above properties of transmit antenna cancellation (based on phase offset) analogously apply to receive cancellation as well, we can easily extend our proposed scheme to employ two stages (transmit and receive) of antenna cancellation in tandem. In the first stage two transmit antennas transmit at equal power and $\pi$ out of phase signals that destructively interfere at any point on the PB of the transmit antennas. Now, place two RX antennas symmetrically on the PB of the transmit antennas as shown in FIG. 6(a), such that the TX and RX sets of antennas are on each other's PB.

While the transmit signals add destructively at each RX antenna, the signals received from the two RX antennas are further combined 180 degrees out of phase to provide the second level of antenna cancellation. Note that though four antennas are employed to achieve two levels of antenna cancellation, the number of RF chains used is still only two (for forward and reverse streams).

The isolation (in dB) achieved by these two stages of cancellation are additive in theory although in practice the cancellations might not be perfectly additive. In fact under ideal conditions even a one stage cancellation should provide a perfect null. However, gain imbalance or a slight phase offset between the signals may prevent us from achieving a perfect null, wherein a residue of the self-interference signal remains. We can now establish the following property.

"Under small gain imbalance and/or phase offset (from imprecise antenna placement or imperfect RF devices) between the transmit and receive cancellation paths, the self-interference cancellation provided by two levels of antenna cancellation are additive (in dB scale)."

Figure 6B:
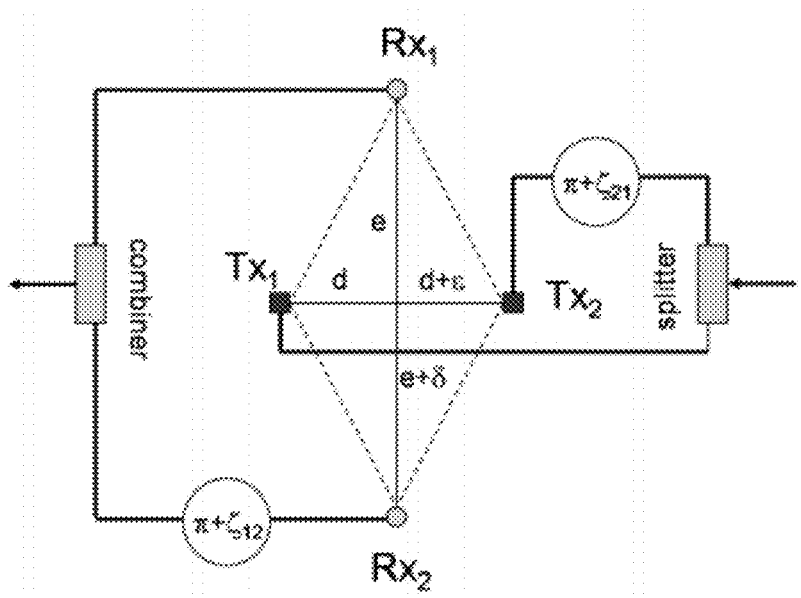

Consider the antenna placement in FIG. 6(b). While the distance of all the antenna from the origin must be d, Applicants model the imprecision in antenna placement with small deviation in distances as d and d+ε for the 2 TX antennas on the horizontal axis, and e and e++δ for the 2 RX antennas on the vertical axis (e, δ ≪ λ). Note that e≠d accounts for imprecise placement for all antennas where the imprecision in the antenna placement is modeled by having two axis that are not completely orthogonal and placing 2TX antennas on the horizontal and 2RX antennas on the vertical axis where the measurement from the cross section of the axis are d, d+ε, e, e+δ, respectively, for some small deviations ε and δ.

We also model the imprecision in the RF circuitry by considering small phase differences $\theta_t$ and $\theta_r$ and gain differences $\alpha_t$ and $\alpha_r$ in the transmit and receive cancellation circuits, respectively. The received signal y(t) at time t can now be written as:

$$y(t) = A_{11}x(t)e^{j(2\pi f_c t + \phi_{11})} + A_{12}x(t)e^{j(2\pi f_c t + \phi_{12})} + A_{21}x(t)e^{j(2\pi f_c t + \phi_{21})} + A_{22}x(t)e^{j(2\pi f_c t + \phi_{22})}$$

where x(t) is the baseband signal, $f_c$ is the transmission frequency, and $A_{ij}$ and $\phi_{ij}$ denotes the gain and phase shift of the signal transmitted from transmit antenna i to receive antenna j under free space path loss model. Note that $A_{ij}$ and $\phi_{ij}$ include the gain imbalance and phase imprecision caused by RF circuitry as well as imprecise placement of the antennas.

Let $d_{ij}$ denote the distance between transmit antenna i to the receive antenna j.

$$\text{We have, } d_{11} = \sqrt{d^2 + e^2}, \; d_{12} \approx d_{11} + \frac{e}{d_{11}}\delta$$

$$d_{21} \approx d_{11} + \frac{d}{d_{11}}\epsilon, \; d_{22} \approx d_{11} + \frac{d}{d_{11}}\epsilon + \frac{e}{d_{11}}\delta$$

$$\text{For gain, we have, } A_{11} = A\left(\frac{4\pi\lambda}{d_{11}}\right)^2, \; A_{12} = A\alpha_r\left(\frac{4\pi\lambda}{d_{12}}\right)^2 = A_{11}a_{12},$$

$$\text{where, } a_{12} = \alpha_r\left(\frac{d_{11}}{d_{12}}\right)^2 \approx \alpha_r\left(1 - \frac{2e\delta}{d_{11}^2}\right)$$

$$\text{Similarly, } A_{21} = A\alpha_t\left(\frac{4\pi\lambda}{d_{21}}\right)^2 = A_{11}a_{21} \approx A_{11}\alpha_t\left(1 - \frac{2d\epsilon}{d_{11}^2}\right)$$

$$\text{Now, it can be shown that, } A_{22} = A\alpha_t\alpha_r\left(\frac{4\pi\lambda}{d_{22}}\right)^2 \approx A_{11}a_{12}a_{21}$$

$$\text{For phase, } \phi_{11} = \frac{2\pi d_{11}}{\lambda}, \; \phi_{12} = (\pi + \theta_r) + \frac{2\pi d_{12}}{\lambda} = \pi + \phi_{11} + \xi_{12}$$

$$\phi_{21} = (\pi + \theta_t) + \frac{2\pi d_{21}}{\lambda} = \pi + \phi_{11} + \xi_{21}$$

$$\text{We now have, } \phi_{22} = (\pi + \theta_t) + (\pi + \theta_r) + \frac{2\pi d_{22}}{\lambda} = \phi_{11} + \xi_{12} + \xi_{21}$$

In one stage receive antenna cancellation (TX2 is not transmitting), the received signal can be written as:

$$y_1(t) \approx A_{11}x(t)e^{j(2\pi f_c t + \phi_{11})}(1 - e^{j\xi_{12}}) + A_{11}(a_{12} - 1)x(t)e^{j(2\pi f_c t + \phi_{12})}$$

Similarly, in one stage transmit antenna cancellation (RX2 is not receiving), the received signal can be written as:

$$y_2(t) \approx A_{11}x(t)e^{j(2\pi f_c t + \phi_{11})}(1 - e^{j\xi_{21}}) + A_{11}(a_{21} - 1)x(t)e^{j(2\pi f_c t + \phi_{21})}$$

For our two-stage cancellation, we can denote:

$$y(t) \approx A_{11}x(t)e^{j(2\pi f_c t + \phi_{11})}(1 - e^{j\xi_{12}}) + A_{11}(a_{12} - 1)x(t)e^{j(2\pi f_c t + \phi_{12})} +$$
$$A_{21}x(t)e^{j(2\pi f_c t + \phi_{21})}(1 - e^{j\xi_{12}}) + A_{21}(a_{12} - 1)x(t)e^{j(2\pi f_c t + \phi_{22})} \approx$$
$$A_{11}x(t)e^{j(2\pi f_c t + \phi_{11})}(1 - e^{j\xi_{12}})(1 - e^{j\xi_{21}}) +$$
$$A_{11}(a_{12} - 1)x(t)e^{j(2\pi f_c t + \phi_{12})}(1 - e^{j\xi_{21}}) +$$
$$A_{11}(a_{21} - 1)x(t)e^{j(2\pi f_c t + \phi_{21})}(1 - e^{j\xi_{12}}) +$$
$$A_{11}(a_{12} - 1)(a_{21} - 1)x(t)e^{j(2\pi f_c t + \phi_{22})}$$

Hence we have $$\frac{y(t)}{A_{11}} \approx \frac{y_1(t)}{A_{11}} \cdot \frac{y_2(t)}{A_{11}},$$

implying that the gains of two stage cancellations are additive.

We now briefly discuss the effect of such imprecision in our single and dual stage cancellation methods.

Extension to MIMO Systems

Figure 7:
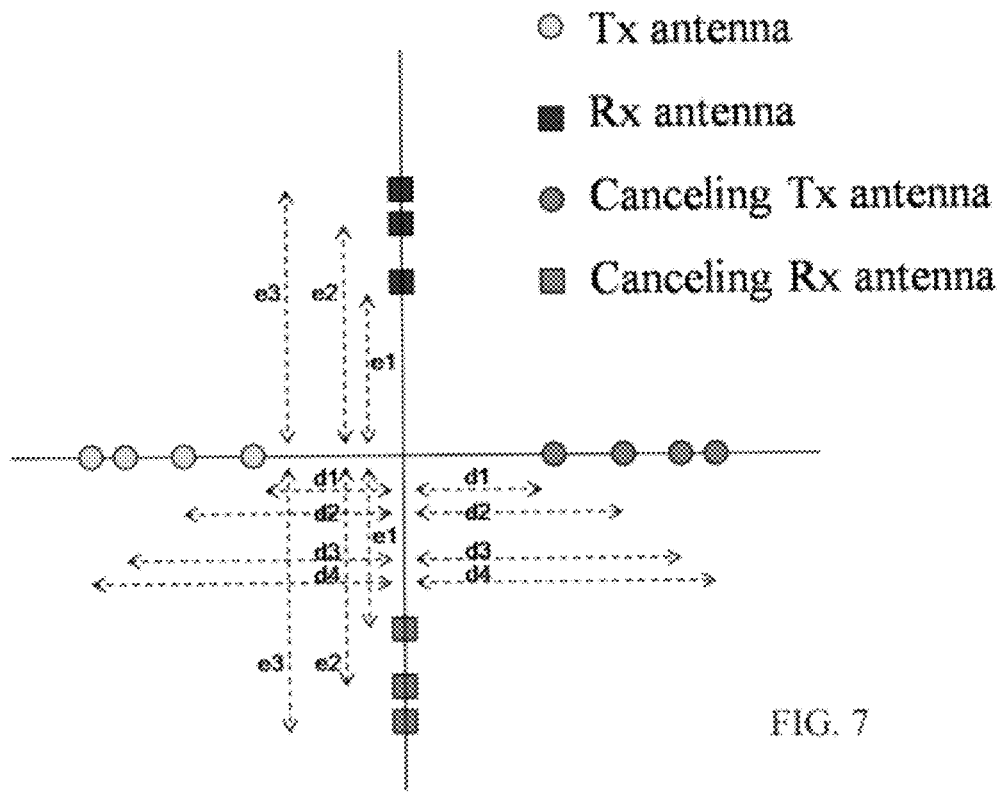
FIG. 7 depicts two level antenna cancellation+MIMO (3×4), in accordance with the invention.

Realizing null points on a straight line is critical because it facilitates the design of MIMO transmit and receive antenna arrays. Hence, our proposed two-level antenna cancellation solution based on phase offset can be readily extended to MIMO systems by using ordinary and widely used linear antenna array configurations. In particular, to generate a N×M MIMO+FD system, we start by placing two sets of antennas (N transmit and M receive) on two perpendicular axis to allow for N×M MIMO (in each direction of FD) as shown in FIG. 7 of the present application.

Then, to enable this N×M system with full duplex, we use an equal number of transmit (N) and receive (M) canceling antennas and place them in a symmetric position on the opposite side of their respective axis. The MIMO transmit streams from the N transmit and their respective cancelling antennas will add out of phase at each of the receive antennas in the first stage of cancellation. The composite received signals at each of the M receive antennas are then further combined out of phase with their respective cancelling antennas to provide the second level of cancellation.

It is worth pointing out that only such symmetric antenna configurations can be extended to generic MIMO systems without the need for variable attenuators and delay elements. Again note that, while 2(N+M) antennas are employed for achieving two levels of antenna cancellation with FD, the total number of RF chains required is only N+M, which is the minimum required to enable N×M MIMO communication in either direction. FIG. 7 shows the antenna structure for a 4×3 MIMO+FD node where three and four data streams are simultaneously transmitted and received respectively using full duplex.

Again it is noted that, while eight antennas are employed for achieving two levels of antenna cancellation for each of the two streams, the total number of RF chains required is only four, which is the minimum required to enable four data stream communication.

Comparison with Analog Cancellation

The fixed phase offset of π between copies of the transmit (receive) signals with the inventive technique can be accomplished with the help of a splitter (combiner) and a fixed π phase shifter. The insertion loss of the phase shifter has to be compensated in the other signal path. Alternately, the splitter (combiner) and phase shifter can be replaced by a BALUN if its frequency response is more flat over the desired band.

A key feature of inventive technique is that with two levels of antenna cancellation, there could potentially be avoided analog cancellation and the consequent use of variable attenuators and delays. This is important in a practical system for several reasons:

(i) estimating the self-interference channel in a wide-band frequency selective channel cannot be accomplished effectively with a single variable attenuator and delay line; (ii) a N×M MIMO system would require $N^2$ variable attenuators and delays, while the inventive technique requires only N fixed π phase shifters; and (iii) while the inventive technique employs only one passive RF component, variable attenuators and delays are typically realized with the help of active RF components such as a voltage controlled attenuator, programmable delay lines, etc. Active RF components have relatively poor frequency response in wide-bands and introduce RF active noise and hence must be limited in use or completely avoided if possible in the RF chain.

The inventive technique can be extended to MIMO systems by using ordinary and widely used linear array antenna configuration. In particular it is possible to place two sets of transmit and receive antennas on two perpendicular axis and in order to enable full duplex we used the same number of transmit and receive canceling antennas as the original configuration and place them in symmetrical position from the cross section of the two axis on the same axis. It should be pointed out that this is the only antenna configuration that can be extended into MIMO systems without needs for variable attenuation and delays. This is due to the fact that the line of sight assumption has been experimentally verified in outdoor environment for near field where the distance is less than $$20\lambda = 20\lambda = 20/f_c.$$

However, for larger distance the effect of fading and multipath fading kicks in and the channel statistics exhibits Rayleigh fading distribution. The line of sight is critical for the performance of any RF cancellation scheme. Please note that we classify the scheme in which the estimation is performed in the digital domain as digital cancellation even though the actual cancellation might be performed in the analog domain.

Beside the antenna placement, the antenna directions are also very important to achieve better self-interference suppression. Particularly, we can use +45 and −45 polarized antennas for the transmit and receive antennas, respectively. In The use of polarized antennas considerably reduces the self interference in the near field. However, in rich scattering environment the polarization effect goes away and the average received signals becomes independent of the polarization\cite {jiang2007modelling}. The effect of antenna polarization at the near filed can be understood by considering the antenna patterns of a dipole that is directional in the vertical plane of the dipole but is usually highly attenuated in the direction of the dipole itself.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for full duplex wireless communication comprising the steps of:
   creating a canceling self interference signal using a passive noise cancellation; and
   attaining full-duplex simultaneous in time and overlapping in space wireless transmission and reception on a same frequency band responsive to the step of creating said canceling self interference signal,
   wherein said passive noise cancellation comprises analog noise canceller circuits in multiple stages,
   wherein a residual of the self interference signal in an output signal of each of said multiple stages is cancelled by subtracting an attenuated version of a transmitted signal from said output signal of each of said multiple stages, and
   wherein an average power of the output signal at each stage of the multiple stages is minimized.

2. The method of claim 1, wherein the passive noise cancellation is a noise cancellation that is passive and performed successively.

3. The method of claim 1, wherein said passive noise cancellation comprises digital noise canceller algorithms.

* * * * *